United States Patent Office 3,219,661
Patented Nov. 23, 1965

3,219,661
SPIROOXINDOLE AND SPIRODEHYDROINDOLE ALKALOIDS AND PROCESS THEREFOR
John Shavel, Jr., Mendham, and Harold Zinnes, Rockaway, N.J., assignors to Warner-Lambert Pharmaceutical Company, Morris Plains, N.J., a corporation of Delaware
No Drawing. Filed Dec. 14, 1962, Ser. No. 244,557
23 Claims. (Cl. 260—240)

This invention relates to novel spirooxindole alkaloids of the formula:

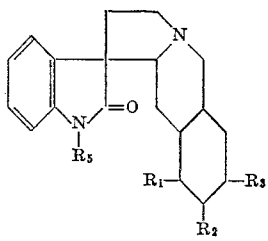

and

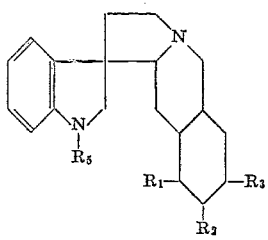

wherein $R_1$ represents hydrogen,

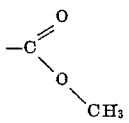

or lower alkyl such as methyl; $R_2$ represents hydrogen, keto, hydroxy, lower alkoxy such as methoxy or acyloxy such as acetoxy; $R_3$ represents hydrogen, or $=CHC_6H_4R_4$ in which $R_4$ represents hydrogen or halogen such as chlorine or bromine, hydroxy or lower alkoxy such as methoxy and $R_5$ represents hydrogen or

and to the nontoxic pharmaceutically acceptable acid addition salts thereof.

The invention also relates to a new and novel method of preparing the above compounds.

We have assigned the name "spiroxyane" to these novel spirooxindole alkaloids and their numbering is represented structurally in the following formula:

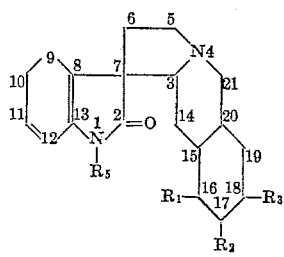

wherein $R_1$, $R_2$, $R_3$ and $R_5$ have the same meaning as described above. Thus, for example, 16-methyl-17-hydroxyspiroxyane can be represented structurally as follows:

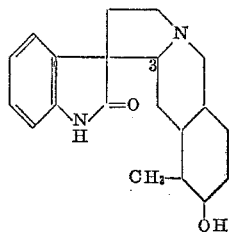

Since the carbon atom at position —3 is asymmetric, two epimers are possible, that is, spiroxyane and epispiroxyane, and these epimers are also within the scope of this invention. The epimers are readily differentiated on paper chromatography by their mobility; the 3-epimer has the greater mobility. Thus, for example, 17-hydroxy-18-benzylidene-3-epispiroxyane has an Rf of 0.60 relative to 17-hydroxy-18-benzylidenespiroxyane which has an Rf of 0.36. In addition, the 3-epi compounds give a positive mercuric acetate test which comprises heating a solution of 50 mg. of the compound to be tested at 45°–55° C. in 2 ml. 5% acetic acid and 200 mg. mercuric acetate. Within a few minutes crystalline mercurous acetate is precipitated.

Exemplary of the new and novel spiroxyanes are spiroxyane,
3-epispiroxyane,
16α-methyl-17α-hydroxyspiroxyane,
16α-methyl-17α-hydroxy-3-epispiroxyane,
16α-carbomethoxy-17α-hydroxyspiroxyane,
16α-carbomethoxy-17α-hydroxy-3-epispiroxyane,
18-benzylidene-17-hydroxyspiroxyane,
18-benzylidene-17-hydroxy-3-epispiroxyane,
17-acetoxy-1-acetyl-16-carbomethoxyspiroxyane,
17-acetoxy-1-acetyl-16-carbomethoxy-3-epispiroxyane,
17-ketospiroxyane,
17-ketoepispiroxyane,
16α-methyl-17-hydroxy-2-desoxyspiroxyane,
16α-methyl-17-hydroxy-2-desoxy-3-epispiroxyane,
16-carbomethoxy-17α-hydroxy-2-desoxyspiroxyane,
16-carbomethoxy-17α-hydroxy-2-desoxy-3-epispiroxyane,
18-benzylidene-17β-spiroxyane,
18-benzylidene-17β-3-epispiroxyane,
18-benzylidene-17-hydroxyspiroxyane,
18-benzylidene-17-hydroxy-3-epispiroxyane,
17α-acetoxy-16α-carbomethoxyspiroxyane,
17α-acetoxy-16α-carbomethoxy-3-epispiroxyane
and the like.

The new and novel compounds of this invention have interesting and significant pharmacological activity and are particularly useful as anti-inflammatory, analgesic and cardiovascular agents. In addition, they are useful as intermediates for the production of other novel oxindoles.

It is known in the art that when yohimbane alkaloids are oxidized by t-butyl hypochlorite, and then treated with an alcoholic solution of hydrogen chloride, 3-dehydroyohimbane chlorides are obtained. The reaction may be represented by the following equation:

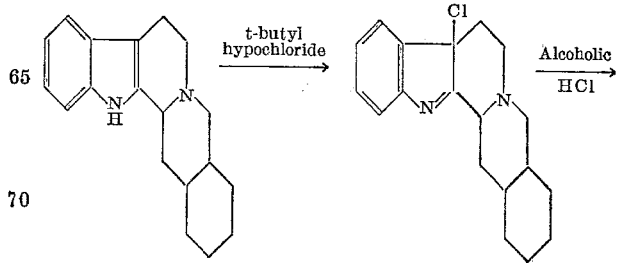

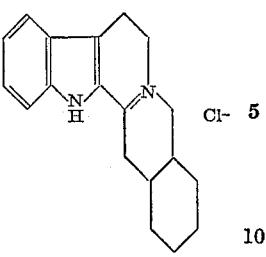

to its corresponding oxindole analog mitraphylline of the formula:

We have found that when yohimbane alkaloids are oxidized by t-butyl hypochlorite and then hydrolyzed at a slightly acidic pH novel spiroxyanes are produced. Thus, for example, a methylene chloride-carbon tetrachloride solution of yohimbine of the formula:

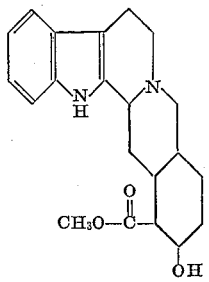

by first treating ajmalicine with t-butyl hypochlorite and then hydrolyzing as described above. The spiroxanes obtained by the novel oxidative process of this invention may be treated further to yield novel derivatives. Thus, for example, when 16-carbomethoxy-17-hydroxyspiroxyane is used as the starting material the following derivatives as exemplified by the following series of reactions are readily obtained.

is oxidized by t-butyl hypochlorite and after the removal of the solvent the corresponding chloro derivative of the formula:

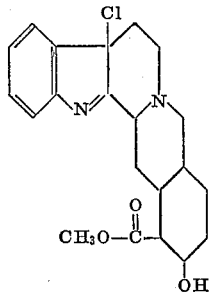

is obtained. The chloro derivative is then hydrolyzed by refluxing in 50% aqueous methanol having a pH of 6, to obtain a spiroxyane of the formula:

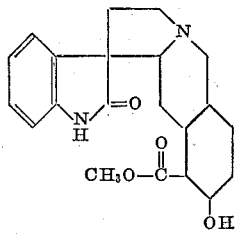

Alternatively, the chloro derivative may be refluxed together with silver nitrate and the same spiroxyane is obtained.

Furthermore, we have found that our novel process is also useful to convert ajmalicine of the structure:

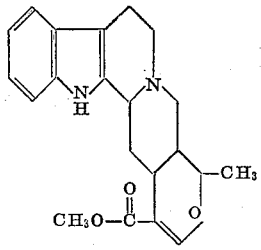

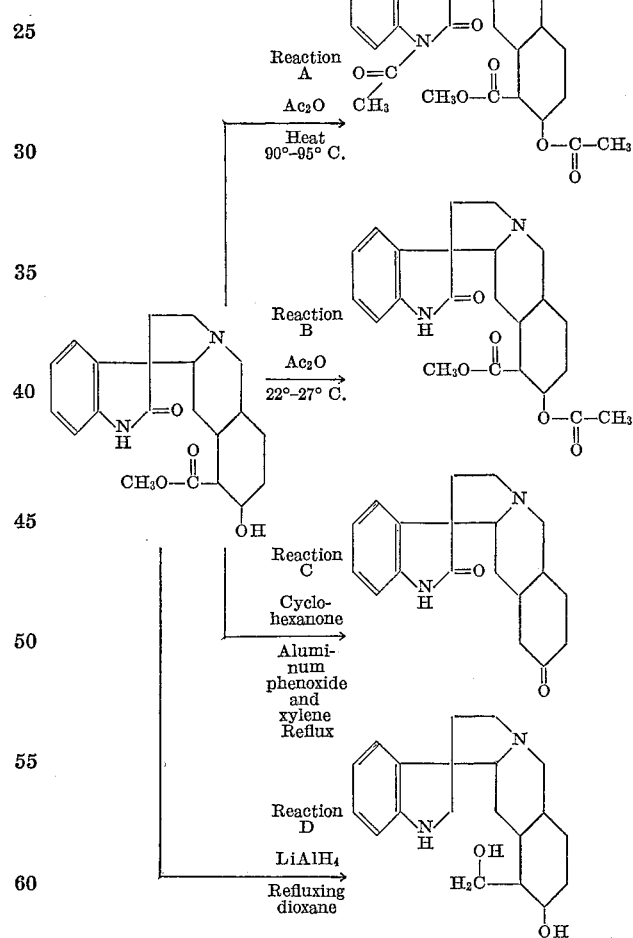

Reaction A in the above diagram involves acetylation of the spiroxyane with acetic anhydride at 90°–95° C. whereby 17-acetoxy-1-acetyl-16-carbomethoxy spiroxyane is readily obtained. On the other hand, when the acetic anhydride reaction is allowed to proceed at 22°–27° C. as represented in Reaction B, 17-acetoxy-16-carbomethoxy spiroxyane is obtained. This compound differs from the reaction product of A in the absence of the —COCH₃ group on the nitrogen atom. Reaction C involves refluxing the spiroxyane in xylene with cyclohexanone and aluminum phenoxide to obtain 17-keto spiroxyane. The latter when reacted with an alkali metal borohydride such as potassium borohydride is readily converted into 17-hydroxyspiroxyane. The 17-keto spiroxyane obtained when treated with benzaldehyde in the presence of an alkali is readily converted into 18-benzylidene-17-keto spiroxyane of the formula:

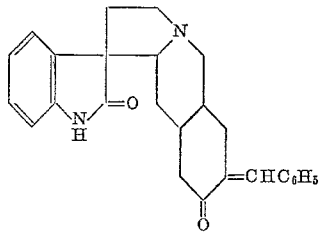

The benzylidene derivative is reactive with potassium borohydride to produce 18-benzylidene-17-hydroxyspiroxyane. Reaction D represents the reduction of the spiroxyane with lithium aluminum hydride and this reduction produces the 2-desoxy derivative that is 17-hydroxy-16-hydroxymethyl-2-desoxyspiroxyane. Employing analogous reaction conditions spiroxyanes such as, for example, 16-methyl-17-hydroxyspiroxyane can be reduced also to their desoxy derivative by lithium aluminum hydride.

As can be readily appreciated, the starting materials described to prepare the novel compounds of this invention are alkaloids of the yohimbane series and, depending upon the configuration of the carbon atom at the 3-position and the existence of cis or trans fusion of the D and E rings, different configurations are possible, that is, yohimbane, 3-epiyohimbane, alloyohimbane and 3-epialloyohimbane. Since the novel spiroxyanes are prepared from the yohimbane alkaloids, the present invention also includes within its scope derivatives of these four families of spiroxyanes bearing $R_1$, $R_2$ and $R_3$ substituents at the 16, 17 and 18 positions, respectively.

The compounds of this invention may be converted to the pharmaceutically acceptable nontoxic acid addition or quarternary ammonium salts. Useful acid addition salts are those from such acids as maleic, fumaric, benzoic, succinic, citric, tartaric, hydrochloric, hydrobromic, phosphoric and the like. The addition salts may be prepared in the conventional manner, for example, by treating a solution or suspension of the free base in an inert organic solvent with the desired acid and then recovering the salt which forms by crystallization techniques. The quarternary salts are prepared by heating a solution of the base in a suitable solvent with a reactive alkyl halide such as methyl iodide, ethyl bromide, benzyl chloride or another reactive ester such as methyl sulfate, ethyl sulfate and methyl p-toluene sulfonate.

For therapeutic uses the new and novel compounds of this invention either as the free base or in the form of a pharmaceutical acceptable nontoxic acid addition or quaternary ammonium salt may be formulated with a conventional pharmaceutical carrier to form tablets, capsules, elixirs, solutions, suspensions, suppositories and the like.

The following examples are included in order further to illustrate the present invention.

EXAMPLE 1

*17α-carbomethoxy-17α-hydroxyspiroxyane and 16α-carbomethoxy-17α-hydroxy-3-epispiroxyane*

To a suspension (protected from light) of 8.85 g. (0.025 mole) yohimbine in 150 ml. methylene chloride containing 4 ml. triethylamine is added dropwise with stirring at −30° C. a solution of 9 ml. tert-butyl hypochlorite in 25 ml. of carbon tetrachloride, the addition requiring about 15 minutes time for completion. After stirring an additional 15 minutes, the mixture is stirred with 25 ml. of water. The layers are separated, the organic layer is washed with two more 25 ml. portions of water, and the organic layer is dried over anhydrous sodium sulfate. It is distilled in vacuo to dryness. The residue is dissolved in 60 ml. methanol, and 60 ml. of water is added. The pH of the solution is adjusted to 6.0 by the addition of 0.5 ml. glacial acetic acid and the solution is refluxed for 30 minutes. After removal of the methanol by distillation in vacuo, and the addition of 100 ml. of water, the pH is 4.4. The very small amount of gum which precipitates is filtered off and discarded, the clear orange filtrate is brought to a pH 8.5 by the addition of aqueous ammonium hydroxide, and the mixture is extracted with chloroform. The chloroform solution is distilled in vacuo to yield a yellowish white amorphous solid. The solid is dissolved in 20 ml. methanol and 5 ml. 6 N methanolic HCl is added slowly with stirring and cooling. Addition of 30 ml. anhydrous ether and scratching induces white crystals to form. After refrigeration at 4°–6° C. for about 1 to 2 hours there is collected 2.4 g. 16α-carbomethoxy-17α-hydroxyspiroxyane hydrochloride hemihydrate, M.P. 230°–234° C. decomposition, $[\alpha]_D^{25}$ +23 (water, c.=1.0). Recrystallization from methanol gives, M.P. 231°–235° C. decomposition, $[\alpha]_D^{25}$ +25 (water, c.=0.95), $[\alpha]_D^{25}$ +130° (pyridine, c.=0.64), $[\alpha]_D^{25}$ +16 (95% ethanol, c.=1.0).

*Analysis.*—$C_{21}H_{27}N_2O_4Cl \cdot \frac{1}{2}H_2O$:
Calc.: C—60.64, H—6.79, N—6.74, Cl—8.53; $OCH_3$—7.44.
Found: C—60.88, H—6.98, N—6.66, Cl—8.60; $OCH_3$—7.08.

To a solution of 2 g. of the spiroxyane hydrochloride hemihydrate in 200 ml. hot absolute ethanol is added 200 ml. dry benzene. The mixture is distilled at atmospheric pressure to near dryness and the last traces of solvent are removed in vacuo. The residue is recrystallized twice from methanol to give unhydrated 16α-carbomethoxy-17α-hydroxyspiroxyane, M.P. 231°–235° C. decomposition, $[\alpha]_D^{25}$ +25° (water, c.=0.65), $[\alpha]_D^{25}$ +137° (pyridine, c.=0.63), $[\alpha]_D^{25}$ +17° (ethanol, c.=0.64); infrared:

$\nu_{max}^{Nujol}$: 3320, 3190, 2700, 2600, 1733, 1705, 1618, 770, 724 cm.$^{-1}$; ultraviolet: $\lambda_{max}^{95\% EtOH}$: 251–252 ($\epsilon$=6320), 279–285 ($\epsilon$=1370)

λ min.: 227 ($\epsilon$=2745), 275 ($\epsilon$=1290) m$\mu$.

*Analysis.*—
Calc.: C—61.98, H—6.69, N—6.89, Cl—8.71.
Found: C—61.92, H—6.86, N—7.05, Cl—8.91.

The free base, 16α-carbomethoxy-17α-hydroxyspiroxyane, is obtained by dissolving the hydrochloride hemihydrate in water, basifying with aqueous ammonium hydroxide, and extracting with chloroform. Distillation in vacuo of the chloroform solution gives a solid residue which is recrystallized from acetone to give material, M.P. 214°–216° C. decomposition, $[\alpha]_D^{25}$ +155 (pyridine, c.=0.55), $[\alpha]_D^{25}$ +17 (95% ethanol, c.=1.0), Rf 0.16; infrared:

$\nu_{max}^{Nujol}$: 3350, 3210, 2800, 2760, 1725, 1702, 1610, 748 cm.$^{-1}$;
$\lambda_{max}^{CHCl_3}$: 3460, 3210, 2900, 2743, 1723, 1710, 1624 cm.$^{-1}$;
ultraviolet: $\lambda_{max}^{95\% EtOH}$: 251–252 ($\epsilon$=7220), 277–282 shoulder ($\epsilon$=1440) m$\mu$ λ min.: 227 ($\epsilon$=2590) m$\mu$.

*Analysis.*—$C_{21}H_{26}N_2O_4$:
Calc.: C—68.08, H—7.08, N—7.56.
Found: C—68.02, H—7.21, N—7.43.

The acidic ethereal methanol filtrate from the 16α-carbomethoxy-17α-hydroxyspiroxyane hydrochloride is distilled in vacuo to dryness, the residue is dissolved in 100 ml. water, and 5 ml. 70% perchloric acid is added. The precipitate which forms is filtered off and discarded. The aqueous filtrate is basified with aqueous ammonium hydroxide, and extracted with chloroform. Distillation in vacuo of the chloroform solution gives a residue which on trituration with petroleum ether gives 3.5 g. of crude 16α-carbomethovy-17α-hydroxy-3-epispiroxane. On chromatography it gives a single spot, $Rf$ 0.41 relative to 16α-carbomethoxy-17α-hydroxy-3-epispiroxane. On 0.16 N. This substance gives a positive mercuric acetate test.

A slight excess of ethereal hydrogen chloride is added to a solution of 2 g. of the amorphous solid in 150 ml. anhydrous ether while stirring and cooling on an ice bath. The gummy precipitate, thus obtained, is triturated with dry ether and then refluxed with 200 ml. methyl ethyl ketone. A small amount of insoluble material is filtered off and the filtrate is concentrated by distillation at atmospheric pressure. The initial crops of reddish gummy material which separate out are filtered off and the filtrate is concentrated further till white crystals begin to separate. After standing at room temperature for 16–24 hours the crystals are collected and recrystallized from methyl ethyl ketone to give 550 mg. of pure 16α-carbomethoxy-17α-hydroxy-3-epispiroxane hydrochloride, M.P. 231°–235° C. decomposition, $[\alpha]_D^{25}$ +101 (water, c.=0.86); infrared:

$\nu_{max}^{Nujol}$: 3380, 3130, 2600, 1727, 1622, 760; ultraviolet: $\lambda_{max}^{95\% EtOH}$: 251 ($\epsilon$=6800), 282 ($\epsilon$=1400)

$\lambda$ min.: 226–227 ($\epsilon$=2950), 274 ($\epsilon$=1300).

Analysis.—$C_{21}H_{26}N_2O_4 \cdot HCl$:
  Calc.: C—61.98, H—6.69, N—6.88, Cl—8.71
  Found: C—61.80, H—6.88, N—6.64, Cl—8.86

On paper chromatography it gives a single spot, $Rf$ 0.38 relative to 16α-carbomethoxy-17α-hydroxyspiroxane hydrochloride having $Rf$ 0.14. The substance gives a positive mercuric acetate test.

*Preparation of 16α-carbomethoxy-17α-hydroxyspiroxane using silver nitrate*

To a suspension (protected from light) of 8.85 g. (0.025 mole) yohimbine in 150 ml. methylene chloride containing 4 ml. triethylamine is added dropwise with stirring at −30° a solution of 9 ml. tert-butyl hypochlorite in 25 ml. of carbon tetrachloride, the addition requiring about 15 minutes time for completion. After stirring an additional 15 minutes, the mixture is stirred with 25 ml. water. The layers are separated, the organic layer is washed with two more 25 ml. portions of water, and the organic layer is dried over anhydrous sodium sulfate. It is distilled in vacuo to dryness, the residue is dissolved in a mixture of 50 ml. methanol and 25 ml. water on the addition of a solution of 3.6 g. silver nitrate in a mixture of 50 ml. methanol and 10 ml. water a small amount of white precipitate is formed. The mixture is refluxed for thirty minutes, during which time a considerable amount of silver chloride precipitated from solution. This is removed by filtration and the filtrate is made alkaline with ammonium hydroxide. Extraction with chloroform, drying the chloroform solution over sodium sulfate and distillation to dryness yields a yellowish white amorphous solid. This is dissolved in 20 ml. methanol and 5 ml. 6N methanolic hydrogen chloride is added slowly with stirring and cooling. Addition of 30 ml. anhydrous ether and scratching induced white crystals to form. After refrigeration there is obtained 1.8 g. 16α-carbomethoxy-17α-hydroxyspiroxane hydrochloride, $[\alpha]_D^{25}$ +25° (water, c.=1.0), identified by its infrared and ultraviolet spectra.

EXAMPLE 2

*16α-methyl-17α-hydroxyspiroxane and 16α-methyl-17α-hydroxy-3-epispiroxane*

A mixture of 46.5 g. (0.15 mole) 16α-methylyohimbol, 24 ml. triethylamine, and 900 ml. methylene chloride is cooled to −30° to −40° and a solution of 27 ml. t-butyl hypochlorite in 81 ml. carbon tetrachloride is added dropwise with stirring over a period of about 15 minutes, the materials being protected from light. After stirring for an additional 15 minutes the reaction mixture is stirred with 200 ml. water, the layers are separated and the organic layer is washed with 300 ml. more water. The organic layer is dried over sodium sulfate and distilled in vacuo to yield a dark oil which is dissolved in 300 ml. methanol. After the addition of 300 ml. water followed by 1.5 ml. glacial acetic acid to lower the pH to 6.0 the resulting solution is refluxed 45 minutes. The methanol is distilled off and 400 ml. more water is added. The small amount of dark insoluble material is filtered off and discarded. The filtrate (pH 4.0) is made alkaline (pH 8.5) by the addition of ammonium hydroxide and is then extracted with chloroform. The dried chloroform solution is distilled in vacuo to dryness, and the residue is triturated with petroleum ether to yield an off white amorphous powder. Paper chromatography shows two spots of approximately equal size having $Rf$ .66 and .35, respectively. The solid is refluxed with 200 ml. acetone for 15 minutes and the mixture allowed to stand for 20 to 24 hours at 25° to 29° C. The resulting crystals are then refluxed with a mixture of 200 ml. acetone and 25 ml. methanol, to yield, after standing at 25° to 29° C., 16.2 g. 17α-hydroxy-16α-methylspiroxane, M.P. 248°–254° C. decomposition, $[\alpha]_D^{25}$ +126 (pyridine, c.=0.69). Paper chromatography shows only a single spot corresponding to the slower moving component of the crude mixture. Recrystallization of a portion from methanol gives pure 16α-methyl-17α-hydroxyspiroxane, M.P. 246°–249° C. decomposition, $[\alpha]_D^{25}$ +131 (pyridine, c.=0.68); $[\alpha]$ −10− (chloroform, c.=0.27); infrared:

$\nu_{max}^{Nujol}$ 3420, 3280, 1740, 1685, 1620, 974, 766; $\nu_{max}^{CHCl_3}$ 3420, 3200, 1723, 1710, 1620, 970; ultraviolet: $\lambda_{max}^{95\% EtOH}$ 252 ($\epsilon$=7550), 280 ($\epsilon$=1500)

$\lambda$ min.: 228 ($\epsilon$=2950).

Analysis for $C_{20}H_{26}N_2O_2$:
  Calc.: C—73.58, H—8.03, N—8.58
  Found: C—73.35, H—7.96, N—8.48

The mercuric acetate test is negative.

The hydrochloride is prepared by treatment of a methanol suspension of the base with a slight excess of methanolic hydrogen chloride and the crude product is precipitated by the addition of anhydrous ether. Recrystallization from isopropyl alcohol gives material which sinters at 225°, slowly decomposes and then melts with decomposition at 273°–285° C.; $[\alpha]_D^{25}$ +10 (water, c.=0.06); ultraviolet:

$\lambda_{max}^{95\% EtOH}$: 251–252 ($\epsilon$=6950), 281–284 ($\epsilon$=1600)

$\lambda$ min.: 227 ($\epsilon$=2600), 275 ($\epsilon$=1400)

Paper chromatography shows a single spot with the same mobility as the base. The mercuric acetate test is negative.

Analysis for $C_{20}H_{26}N_2O_2 \cdot HCl \cdot C_3H_7OH$:
  Calc.: C—65.30, H—8.34, N—6.62, Cl—8.38
  Found: C—65.48, H—8.41, N—6.63, Cl—8.13

The mother liquor from the first refluxing with acetone is distilled to dryness, the residue is dissolved in 500 ml. ether, the solution filtered to remove insoluble material, and the filtrate treated with a slight excess of methanolic HCl. The yellow gum thus obtained is solidified by trituration with ether and is dissolved in 100 ml. methanol. The solution is heated to boiling, 300 ml. methyl ethyl ketone is added, and distillation at atmospheric pressure is carried out until crystals start to separate, and the resulting mixture is allowed to stand at room temperature. The combined first three crops of slightly off white crystals weighed 9.5 g., M.P. 288°–296° C. decomposition, $[\alpha]_D^{25}$ +102 (pyridine, c.=0.68), $[\alpha]_D^{25}$ +71 (water, c.=0.62). Recrystallization by the same procedure gives 7 g. white crystals, M.P. 300°–302° C. decomposition, $[\alpha]_D^{25}$ +86 (pyridine, c.=0.5), $[\alpha]_D^{25}$ +65 (water, c.=0.68). Paper chromatography shows only a single spot corresponding to the faster moving component of the crude mixture. A portion is recrystallized again by the same procedure to give pure 17α-hydroxy-16α-methyl-3-epispiroxyane hydrochloride: M.P. 301°–303° C. decomposition, $[\alpha]_D^{25}$ +83 (pyridine, c.=0.60), $[\alpha]_D^{25}$ +63 (water, c.=0.62); infrared:

$\lambda_{max.}^{Nujol}$ 3400, 3100, 1700, 1618, 759; ultraviolet: $\lambda_{max.}^{95\% EtOH}$ 252 ($\epsilon$=7125), 282–283 ($\epsilon$=1450)

$\lambda$min.: 227 ($\epsilon$=3000), 275 ($\epsilon$=1300). The mercuric acetate test is positive.

Analysis for $C_{20}H_{26}N_2O_2 \cdot HCl$:
Calc.: C—66.19, H—7.50, N—7.72, Cl—9.77
Found: C—66.09, H—7.32, N—8.00, Cl—9.96

EXAMPLE 3

7-chloroyohimbane

To a suspension (protected from light) of 56 g. (0.2 mole) yohimbane in 960 ml. methylene chloride containing 37 ml. triethylamine is added, dropwise with stirring at —20° C., 72 ml. 50% (v./v.) solution of tert-butyl hypochlorite in carbon tetrachloride previously diluted with an equal volume of methylene chloride over a period of 45 minutes. After stirring an additional 45 minutes, the mixture is stirred with 200 ml. water, dried over sodium sulfate, and distilled in vacuo to dryness. The residue is triturated with 200 ml. absolute ethanol until a white crystalline solid is obtained. This is collected and washed by stirring at room temperature for 15 minutes with 100 ml. more ethanol. The solid is dissolved in 2 liters of petroleum ether, the solution is filtered to remove a small amount of dark insoluble material, and is then evaporated to dryness to yield after drying in vacuo at 40° C. for four hours 38 g. of 7-chloroyohimbane, M.P. 256°–270° C. decomposition, $[\alpha]_D$ +27 (methylene chloride (c.=.54).

$\lambda_{max.}^{EtOH}$ 225 ($\epsilon$=21,200), 285–295 ($\epsilon$=2400), $\lambda$ min. 246 ($\epsilon$=1800). $\nu_{max.}^{Nujol}$ 1592, 778, 772, 754, 746

Analysis for $C_{19}H_{23}N_2Cl$:
Calc.: C—72.48, H—7.36, N—8.90, Cl—11.26
Found: C—72.17, H—7.37, N—8.78, Cl—11.30

EXAMPLE 4

Spiroxyane and 3-epispiroxyane

A mixture of 9.5 g. of crystalline 7-chloroyohimbane, 125 ml. methanol, 100 ml. water and 0.5 ml. glacial acetic acid is refluxed forty minutes. The methanol is distilled off and 150 ml. water is added. The solution is filtered to remove small amounts of insolubles, is basified by the addition of 10 ml. concentrated ammonium hydroxide, and is extracted with methylene chloride. The dried methylene chloride solution is distilled in vacuo to dryness and the residue is refluxed for a few minutes with acetonitrile to cause crystallization. After standing overnight there is collected 6.8 g. of crystalline material whose paper chromatogram show spots Rf 0.55 and 0.71.

A solution of 5 g. of this material in 1000 ml. boiling absolute ether is filtered, distilled at atmospheric pressure to a volume of 300 ml., allowed to stand for 20 to 24 hours at 22° to 27° C., and the resulting crystals collected. There is obtained 1.4 g. of material, $[\alpha]_D$=—2 (pyridine, c.=0.65), $[\alpha]_D$=—42 (methanol, c.=0.71), whose chromatogram consists almost entirely of the slowest moving spot with only a trace of the faster spot. Recrystallization from acetonitrile gives 0.75 g. chromatographically pure spiroxyane, M.P. 189°–192° C. decomposition, $[\alpha]_D$=—3 (pyridine, c.=0.70), $[\alpha]_D$=—44 (methanol, c.=0.65), $[\alpha]_D$=—39 (0.1 N HCl, c.=0.70).

$\lambda_{max.}^{95\% EtOH}$ 251–252 ($\epsilon$=7350), shoulder 283 ($\epsilon$=1650), $\lambda$ min. 226–227 ($\epsilon$=2850). $\nu_{max.}^{Nujol}$ 3400, 1728, 1710, 1621, 748, $\lambda_{max.}^{CH_2Cl_2}$ 3420, 3180, 1720, 1706, 1618

It gives a negative mercuric acetate test.

Analysis.—Found: C—77.13, H—8.21, N—9.23.

The ether filtrate is evaporated to dryness and is chromatographed over florisil using 50–50 benzene-chloroform as the eluant. The first 1000 ml. of eluate is collected and evaporated to dryness to give 2.2 g. of material $[\alpha]_D$=—58 (pyridine, c.=0.74), $[\alpha]_D$=—26 (methanol, c.=0.68), whose chromatogram shows only the faster spot. Recrystallization from acetonitrile gives 1.5 g. 3-epispiroxyane, M.P. 199°–202° C. decomposition, $[\alpha]_D$=—60 (pyridine, c.=0.55), $[\alpha]_D$=—30 (methanol, c.=0.70), $[\alpha]_D$=+12 (0.1 N CHl, c.=0.58)

$\lambda_{max.}^{95\% EtOH}$ 251–252 ($\epsilon$=7000), shoulder 282 ($\epsilon$=1500), $\lambda$ min. 227 ($\epsilon$=3000). $\nu_{max.}^{Nujol}$ 3230, 1710, 1678, 1617, 758, 744, 717 (broad); $\nu_{max.}^{CH_2Cl_2}$ 3420, 3180, 1720, 1706, 1618, cm.$^{-1}$ It gives a positive mercuric acetate test.

Analysis.—Found: C—77.20, H—8.35, N—9.31.

EXAMPLE 5

7-chloro-17-hydroxy-18-benzylideneyohimbane

To a stirred suspension (protected from light) of 30.7 g. 18-benzylidene-17-hydroxy-yohimbane in 385 ml. methylene chloride containing 15 ml. triethylamine is added dropwise at —20° C., 29 ml. 50% (v./v.) solution of tert-butyl hypochlorite in carbon tetrachloride over a period of 15 minutes. After stirring an additional 30 minutes 100 ml. water are added and the layers are then separated, and the organic layer is washed with 100 ml. water. The organic layer is dried over sodium sulfate and the solvent is distilled off to obtain crystalline 7-chloro-17-hydroxy-18-benzylideneyohimbane, M.P. 188°–191° C. decomposition, $[\alpha]_D$=—236 (pyridine, c.=0.65), $[\alpha]_D$=—200 (methylene chloride, c.=0.50), weighed 10 g. A sample on recrystallization from methylene chloride starts to darken at 141° C. and melts with decomposition at 188°–191° C.

$[\alpha]_D$=—255 (pyridine, c.=0.6)
$[\alpha]_D$=—188 chloroform, c.=0.6)
$[\alpha]_D$=—210 (methylene chloride, c.=0.54)

$\nu_{max.}^{Nujol}$ 3360, 1654, 1592, 784, 752, 705. $\nu_{max.}^{CH_2Cl_2}$ 232, shoulder 252

Analysis for $C_{26}H_{27}N_2OCl$:
Calc.: C—74.53, H—6.50, N—6.69, Cl—8.46
Found: C—74.48, H—6.61, N—6.79, Cl—8.58

EXAMPLE 6

17-hydroxy-18-benzylidenespiroxyane and 17-hydroxy-18-benzylidene-3-epispiroxyane from crystalline 7-chloro-17-hydroxy-18-benzylideneyohimbane A mixture of 8.4 g. 7-chloro-17-hydroxy-18-benzylideneyohimbane, 300 ml. methanol, 150 ml. water, and 0.5 ml. glacial acetic acid is refluxed 45 minutes. The methanol is distilled off, 300 ml. more water is added, the mixture is made basic by the addition of 10 ml. concentrated ammonium hydroxide, and is extracted with methylene chloride. The dried (sodium sulfate) methylene chloride solution is evaporated to dryness and the residue is crystallized from acetone to yield 3.2 g. 17-hydroxy-18-benzylidenespiroxyane, M.P. 226°–229° C. decomposition, $[\alpha]_D$=—236 (pyridine, c.=0.58), $[\alpha]_D$=—188 (chloroform, c.=0.64). Recrystallization from acetone gives material M.P. 228°–230° C. decomposition, $[\alpha]_D$=—199 (chloroform, c.=0.51)
$[\alpha]_D$=—257 (pyridine, c.=0.60)

$\nu_{max.}^{Nujol}$ 3540, 3220, 3040, 1718, 1690, 1650, 1617, 1596, 754, 745, 704, cm.$^{-1}$. $\lambda_{max.}^{95\% EtOH}$ 245 ($\epsilon$=21,000), inflection 280 ($\epsilon$=2250)

$\lambda$ min.: 224 ($\epsilon$=11,700) m$\mu$. It gives a negative mercuric acetate test.

Analysis:
Calc.: C—77.97, H—7.05, N—7.00
Found: C—78.13, H—7.31, N—7.01

The acetone filtrate is evaporated to dryness and the residue is crystallized from methanol to yield 3.7 g. 17-hydroxy-18-benzylidene-3-epispiroxyane, M.P. 152°–155° C. decomposition, $[\alpha]_D = -322$ (pyridine, c.=0.63), $[\alpha]_D = -240$ (chloroform, c.=0.58). Recrystallization of a portion from methanol gives material, M.P. 152°–155° C. decomposition, $[\alpha]_D = -324$ (pyridine, c.=0.75), $[\alpha]_D = -242$ (chloroform, c.=0.66). On paper chromatography this substance has R$f$ 0.60 relative to 17-hydroxy-18-benzylidenespiroxyane which has R$f$ 0.36, $\nu_{max.}^{Nujol}$ 3440, 3360, 3200, 1708, 1688, 1652, 1618, 1598, 766, 756, 750, 745, 702 cm.$^{-1}$. $\lambda_{max.}^{95\% EtOH}$ 244 ($\epsilon = 20,500$)

$\lambda$ min. 224 ($\epsilon=11,750$). It gives a positive mercuric acetate test.

*Analysis:*
Calc.: C—77.97, H—7.05, N—7.00
Found: C—78.11, H—7.29, N—7.05

EXAMPLE 7

*Preparation of mitraphylline and isomitraphylline from ajmalicine*

A mixture of 7 g. ajmalicine, 3 ml. triethylamine, and 120 ml. methylene chloride is cooled to between −30 and −40° C. and a solution of 4 ml. butyl hypochlorite in 12 ml. carbon tetrachloride is added dropwise with stirring over a period of about 15 minutes, the materials being protected from light. After stirring for an additional 15 minutes the reaction mixture is stirred with 50 ml. water, the layers are separated, and the organic layer washed with two more 50 ml. portions of water. The organic layer is dried over sodium sulfate and distilled in vacuo to yield a dark oil which is dissolved in 100 ml. methanol. After the addition of 100 ml. water followed by 0.5 ml. glacial acetic acid, the resulting solution is refluxed 20 minutes. The methanol is distilled off and 100 ml. more water is added. The small amount of dark insoluble material is filtered off and discarded. The filtrate is made alkaline by the addition of ammonium hydroxide and extracted with chloroform. The dried chloroform solution is distilled in vacuo to dryness to give a residue which solidifies on trituration with petroleum ether. The brownish yellow solid is triturated with 20 ml. methanol to yield 1.8 g. white crystalline material, M.P. 260°–263° C. decomposition, $[\alpha]_D^{25} = -10°$ (chloroform, c.=0.75). Recrystallization from methanol gives 1.5 g. of mitraphylline, M.P. 265°–266° C. decomposition, $[\alpha]_D^{25} = -9°$ (chloroform, c.=0.94), $[\alpha]_D^{25} = +11$ (pyridine, c.=0.65). The infrared spectrum is superimposable in every detail with that of a sample of naturally occurring mitraphylline.

The dark red filtrate from the methanol trituration is distilled in vacuo to dryness. The residue is dissolved in 250 ml. ether, filtered to remove a small amount of insoluble material, and treated with an excess of an ethereal solution of picric acid. The resulting precipitate is collected, washed with ether, and recrystallized from methanol to yield 1.4 g. of material, M.P. 165°–188° C. decomposition. Two more recrystallizations from methanol gives 420 mg. of isomitraphylline picrate, M.P. 207°–209° C. decomposition. Paper chromatography gives a single spot, R$f$ 0.85, as compared with mitraphylline which has R$f$ 0.62. The infrared spectrum is superimposable with that of isomitraphylline picrate prepared from natural sources.

*Analysis for* $C_{27}H_{27}N_5O_{11}$:
Calc.: C—54.27, H—4.56, N—11.72
Found: C—54.54, H—4.58, N—11.48

EXAMPLE 8

*17α-acetoxy-16α-carbomethoxyspiroxyane*

A solution of 3 g. spiroxyane in a mixture of 30 ml. dry pyridine and 15 ml. acetic anhydride is allowed to stand at 25° to 29° C. for 30 hours. After the removal of the solvent by distillation in vacuo, the residue is mixed with 40 ml. water, and 20 ml. aqueous ammonium hydroxide. The mixture is extracted with chloroform and the dried chloroform solution is distilled in vacuo to dryness to yield a residue which is recrystallized from acetone to give 1.6 g. of 17α-acetoxy-16α-carbomethoxyspiroxyane, M.P. 228°231° C. decomposition, $[\alpha]_D^{25} + 75°$ (pyridine, c.=0.78). Recrystallization from acetone gives a M.P. 230°–233° C. decomposition, $[\alpha]_D^{25} +73°$ (pyridine, c.=0.82); $[\alpha]_D^{25} -18$ (chloroform, c.=0.63); infrared:

$\nu_{max.}^{Nujol}$ 3200, 1730, 1720, 1619, 1168, 1228, 1246, 740 cm.$^{-1}$, $\nu_{max.}^{CHCl_3}$ 3200, 1730, 1770, 1700, 1618, 1248, 1160 cm.$^{-1}$; ultraviolet: $\lambda_{max.}^{95\% EtOH}$ 251–252 ($\epsilon = 7400$), 283 shoulder ($\epsilon = 1500$)

$\lambda$ min. 227 ($\epsilon=2800$) m$\mu$.

*Analysis for* $C_{23}H_{23}N_2O_5$:
Calc.: C—66.97, H—6.84, N—6.79
Found: C—67.07, H—6.69, N—6.69

Since the base is too insoluble to carry out the mercuric acetate test, a small portion is converted to the hydrochloride by dissolving in ether and adding HCl. The precipitated hydrochloride which is filtered off and washed with ether gives a negative mercuric acetate test. Paper chromatography gives a single spot R$f$ 0.45 relative to 16α-carbomethoxy-17α-hydroxyspiroxyane, R$f$ 0.16.

EXAMPLE 9

*17-acetoxy-1-acetyl-16α-carbomethoxy-3-epispiroxyane*

A mixture of 25 g. of 16α-carbomethoxy-17α-hydroxyspiroxyane and 150 ml. acetic anhydride is heated on a steam bath (temp. 90°–95°) for 6 hours. It is allowed to stand 16–20 hours at 25°–28° C. and then distilled in vacuo to give a syrup which is dissolved in 300 ml. of water. The solution is basified with ammonium hydroxide and the precipitated solid is filtered off, washed with water, and dried over concentrated sulfuric acid in a vacuum desiccator. The solid is refluxed with 2500 ml. Skellysolve C, and filtered while hot. The filtrate is distilled to dryness and the residue crystallized from 50 ml. acetonitrile to give 12.5 g. of product, M.P. 191°–193° C. decomposition, $[\alpha]_D^{25} +79°$ (pyridine, c.=0.91). Recrystallization from acetonitrile gives M.P. 190°–193° C. decomposition, $[\alpha]_D^{25} +77$ (pyridine, c.=0.7); $[\alpha]_D^{25} +43$ (chloroform, c.=0.62); infrared:

$\nu_{max.}^{Nujol}$ 1758, 1732, 1693, 1620$_x$ 1604, 1260, 1176, 1016, 777, 740 cm.$^{-1}$; $\nu_{max.}^{CHCl_3}$ 1734, 1702, 1604, 1279, 1248, 1015; ultraviolet: $\lambda_{max.}^{95\% EtOH}$ 228–230 ($\epsilon = 9860$), 269–271 ($\epsilon = 1250$)

$\lambda$ min., 222–234 ($\epsilon=9540$) m$\mu$.

*Analysis for* $C_{25}H_{30}N_2O_6$:
Calc.: C—66.06, H—6.65, N—6.16
Found: C—66.02, H—6.70, N—6.06

Since the base is too insoluble to carry out the mercuric acetate test, a small portion is converted to the hydrochloride by dissolving in ether and adding HCl. The precipitated hydrochloride which is filtered off and washed with ether gives a positive mercuric acetate test. Paper chromatography gives a single spot, R$f$ 0.74 relative to 17α-acetoxy-16α-carbomethoxyspiroxyane, R$f$ 0.45.

Concentration of the acetonitrile mother liquor to a volume of 20 ml. gives 4.5 g. of a second crop, M.P. 190°–193° C. decomposition, $[\alpha]_D^{25} +80$ (pyridine, c.=0.63).

EXAMPLE 10

*2-desoxy-17α-hydroxy-16α-methylspiroxyane*

A suspension of 9.8 g. (0.03 mole) 17α-hydroxy-16α-methylspiroxyane and 10 g. lithium aluminum hydride in 750 ml. dioxane is refluxed with stirring for 12 hours.

The reaction mixture is hydrolyzed by the dropwise addition of 10% in excess of the calculated amount of water, stirred with a mixture of 10 g. anhydrous sodium sulfate and 20 g. Supercel, and filtered. The residue is extracted by refluxing with two 250 ml. portions of tetrahydrofuran and filtering while hot. The combined dioxane and tetrahydrofuran filtrates are distilled to dryness, the residue is dissolved in 30 ml. isopropyl alcohol and 15 ml. 6N methanolic hydrogen chloride is added. Addition of 150 ml. anhydrous ether followed by refrigeration gives 6.5 g. of the reaction product 2-desoxy-17α-hydroxy-16α-methylspiroxyane, M.P. 288°–295° C. decomposition, $[\alpha]_D^{25} = +40$ (water, c.=0.65). Recrystallization from isopropyl alcohol gives the pure dihydrochloride, M.P. 290°–297° C. decomposition, $[\alpha]_D^{25} = +41$ water, c.=0.6), $[\alpha]_D^{25} = +98$ (90% aqueous pyridine, c.=0.6), $[\alpha]_D^{25} = +72$ (methanol, c.=0.6).

Analysis for $C_{20}H_{26}N_2O \cdot 2HCl$:

Calc.: C—62.33, H—7.85, N—7.27, Cl—18.40
Found: C—62.05, H—8.08, N—7.07, Cl—18.28

An aqueous solution of the 500 mg. dihydrochloride is basified with ammonium hydroxide and extracted with methylene chloride. The dried methylene chloride solution is distilled to dryness and the residue is recrystallized twice from acetone to give 280 mg. of the pure base, M.P. 178°–180° C., $[\alpha]_D^{25} = +104$ (pyridine, c.=0.61), $[\alpha]_D^{25} = +42$ (chloroform, c.=0.51). Infrared.

$\nu_{max.}^{Nujol}$: 3620, 3320, 1612, 754, 748, 740, $\nu_{max.}^{CHCl_3}$: 3610 (20), 3416 (30), 1606. Ultraviolet: $\lambda_{max.}^{95\% EtOH}$: 243 ($\epsilon=6750$), 296 ($\epsilon=2900$)

λ min.: 723 ($\epsilon=3450$), 269 ($\epsilon=1100$).

Analysis for $C_{20}H_{26}N_2O$:

Calc.: C—76.88, H—9.03, N—8.97
Found: C—76.73 H—9.01, N—9.03

EXAMPLE 11

*17α-hydroxy-16α-hydroxymethyl-2-desoxyspiroxyane*

A mixture of 5 g. of 16α-carbanethoxy-17α-hydroxyspiroxyane and 5 g. lithium aluminum hydride in 300 ml. dioxane is refluxed for 6 hours, diluted with 1000 ml. dry tetrahydrofuran and allowed to stand 18 to 24 hours at 25°–29° C. The mixture is hydrolyzed by careful dropwise addition of a slight excess of water, stirred with anhydrous sodium sulfate, and filtered. The solid residue is extracted by refluxing with two 300 ml. portions of chloroform and the combined chloroform and dioxane tetrahydrofuran solutions are distilled in vacuo to dryness. Since the residue could not be solidified, it is dissolved in methanol, acidified by the addition of methanolic HCl and treated with ether. Initially, there is formed an oil; this solidifies on trituration with several fresh portions of ether. The solid is recrystallized from methanol to give 3.2 g. of 17α-hydroxy-16α-hydroxymethylspiroxyane dihydrochloride, M.P. 275°–285° C. decomposition, $[\alpha]_D^{25} +83°$ (95% aqueous pyridine, c.=0.80). Half of this is recrystallized once more from methanol to give 1.2 g. of material, M.P. 275°–285° decomposition, $[\alpha]_D^{25} +86°$ (95% aqueous pyridine, c.=0.83); $[\alpha]=+41$ (water, c.=0.61); infrared spectrum:

$\nu_{max.}^{Nujol}$ 3520, 3440, 2640, 2620, 2400, 1600, 1572, 1022, 778, 760 cm.$^{-1}$.

Analysis for $C_{20}H_{28}N_2O_2 \cdot 2HCl \cdot \frac{1}{2}CH_3OH$:

Calc.: C—58.99, H—7.73, N—6.71, Cl—16.99
Found: C—59.00, H—7.71, N—7.01, Cl—16.52

The remainder of the once recrystallized dihydrochloride is dissolved in 25 ml. water, basified by the addition of ammonium hydroxide, and the mixture is extracted with chloroform. The dried chloroform solution is distilled to dryness to give a residue which is recrystallized twice from acetone to give 900 mg. 17α-hydroxy-16α-hydroxymethylspiroxyane base, M.P. 215°–219° C. decomposition, $[\alpha]_D^{25} +133$ (pyridine, c.=1.00); infrared spectrum:

$\nu_{max.}^{Nujol}$ 3420, 3320, 1610, 1100, 743, 716, cm.$^{-1}$; ultraviolet: $\lambda_{max.}^{95\% EtOH}$ 243 ($\epsilon=6730$), 296 ($\epsilon=2630$)

λ min. 223 ($\epsilon=3035$), 269 ($\epsilon=820$) mμ.

Analysis for $C_{20}H_{28}N_2O_2$:

Calc.: C—73.14, H—8.59, N—8.53
Found: C—72.85, H—8.63, N—8.32

EXAMPLE 12

*17-keto-3-epispiroxyane*

A mixture of 37 g. 16α-carbomethoxy-17α-hydroxy spiroxyane and 1500 ml. xylene is distilled at atmospheric pressure until about 500 ml. of distillate is collected, 750 ml. of cyclohexanone previously dried over sodium sulfate and 135 g. aluminum phenoxide are successively added, and the mixture is refluxed with stirring for 40 hours. After standing at room temperature, the mixture is extracted with five 400 ml. portions of 10% HCl and the combined aqueous layers are washed with either. The aqueous solution is basified with aqueous ammonium hydroxide solution, and extracted with four 250 ml. portions of chloroform. The dried chloroform solution is distilled to dryness to give a residue which is crystallized from acetone to give 9.5 g. of the reaction product 17-keto-3-epispiroxyane, M.P. 228°–230° C. decomposition, $[\alpha]_D = +53$ (pyridine, c.=1.1). Recrystallization from acetone gives a material, M.P. 228°–230° C. decomposition, $[\alpha]_D = +55°$ (pyridine, c.=1.0); infrared spectrum:

$\nu_{max.}^{Nujol}$ 3300, 1726, 1690, 1624, 756, 742, cm.$^{-1}$; ultraviolet: $\lambda_{max.}^{95\% EtOH}$ 251–252 ($\epsilon=6820$,) 282 shoulder ($\epsilon=1800$)

λ min. 228 ($\epsilon=3720$) mμ. The compound gives a positive mercuric acetate test and moves as one spot, Rf 0.46 on paper chromatography.

Analysis for $C_{19}H_{22}N_2O_2$:

Calc.: C—73.52, H—7.15, N—9.03
Found: C—73.23, H—7.26, N—9.21

EXAMPLE 13

*18-benzylidene-17-keto-3-epispiroxyane*

A solution of 1 g. 3-epispiroxyane, 1 ml. benzaldehyde, and 0.5 ml. 10% aqueous sodium hydroxide in 50 ml. methanol is refluxed for 16 hours. After the addition of 2 ml. more benzaldehyde and 0.5 ml. 10% sodium hydroxide, the refluxing is continued for eight hours longer. The solvent is removed by distillation in vacuo and the resulting oil is dissolved in diluted acetic acid, the solution is basified by the addition of ammonium hydroxide, and the mixture is extracted with chloroform. The chloroform solution is charcoaled, dried over sodium sulfate, and distilled in vacuo to dryness. The residue is dissolved in absolute ether, a slight excess of methanolic hydrogen chloride is added, and the crude hydrochloride is filtered off and washed with ether. It is refluxed with 300 ml. acetone filtered off, and dissolved in water. The aqueous solution is basified with ammonium hydroxide, the resulting precipitate is filtered off, washed with water, dried and recrystallized from methanol to give 0.55 g. of 18-benzylidene-17-keto-3-epispiroxyane, M.P. 238°–241° C. decomposition, $[\alpha]_D = -25$ (pyridine c.=0.50)

$\nu_{max.}^{Nujol}$ 3240, 1790, 1684, 1618, 1592, 755, $\lambda_{max.}^{95\% EtOH}$ shoulder 230 ($\epsilon=10,000$), 265 ($\epsilon=13,000$), 292 ($\epsilon=17,500$)

λ min. 236 ($\epsilon=8000$), 268 ($\epsilon=12,500$).

Analysis for $C_{26}H_{26}N_2O_2$:

Calc.: C—78.36, H—6.58, N—7.03
Found: C—78.20, H—6.54, N—7.23

EXAMPLE 14

*17-Hydroxy-18-benzylidene-3-epispiroxyane from 81-benzylidene-17-keto-3-epispiroxyane*

A mixture of 1 g. 18-benzylidene-17-keto-3-epispiroxyane, 1 g. potassium borohydride, and 25 ml. methanol was stirred at room temperature for 3 hours and then 75 ml. water is added. The resulting white precipitate is filtered off, washed with water, dried, and recrystallized from methanol to give 0.3 g. of product, M.P. 151°–155° C. decomposition, —315 (pyridine, c.=0.63) [α]$_D$ —225 (chloroform, c.=0.56).

Analysis for C$_{26}$H$_{26}$N$_2$O$_2$:
Calc.: C—77.97, H—7.05, N—7.00
Found: C—77.93, H—6.89, N—7.29

EXAMPLE 15

*17-hydroxy-3-epispiroxyane*

A solution of 2 g. 17-keto-3-epispiroxane in 100 ml. methanol is stirred with 2 g. potassium borohydride at room temperature for 24 hours. The methanol is distilled off in vacuo, 50 ml. water is added and the mixture is extracted with chloroform. The chloroform is dried over sodium sulfate and distilled in vacuo to dryness to give 17 - hydroxy - 3 - epispiroxyane[α]$_D$=+35° (pyridine, c. =0.75) which is recrystallized from acetone to give 1.4 g. of product, M.P. 235°–242° C. decomposition, [α]$_D$ =+52° (pyridine, c.=1.25). Further recrystallization gives a M.P. 238°–245° C. decomposition, [α]$_D$=+57° (pyridine, c.=1.12); infrared spectrum:

$\nu_{max.}^{Nujol}$ 3440, 3180, 1711, 1692, 1619, 752, ultraviolet spectrum: $\lambda_{max.}^{95\% EtOH}$ 251 ($\epsilon$ =7180), 282 ($\epsilon$ =1800)

λ min. 228 ($\epsilon$=3900).

Analysis for C$_{19}$H$_{24}$N$_2$O$_2$:
Calc.: C—73.05, H—7.74, N—8.97
Found: C—72.95, H—7.70, N—8.87

The compound gives a positive mercuric acetate test and on chromatography it moves as a single spot, Rƒ 0.19 as compared to 17-keto-3-epispiroxane, Rƒ 0.46.

It is understood that the foregoing detailed description is given merely by way of illustration and that many variations may be made therein without departing from the spirit of our invention.

Having described our invention, what we desire to secure by Letters Patent is:

1. A compound selected from the group consisting of those having the formulas

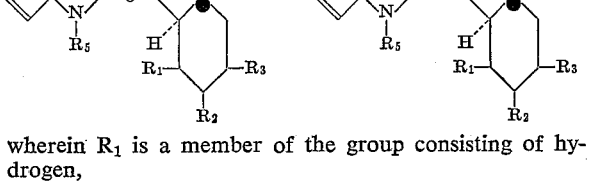

wherein R$_1$ is a member of the group consisting of hydrogen,

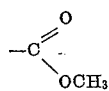

and lower alkyl, R$_2$ is a member of the group consisting of hydrogen, keto, hydroxy, lower alkoxy and acyloxy, R$_3$ is a member of the group consisting of hydrogen and =CHC$_6$H$_4$R$_4$ in which R$_4$ is a member of the group consisting of hydrogen, halogen, hydroxy and —OCH$_3$, and R$_5$ is a member of the group consisting of hydrogen and

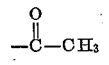

and the nontoxic pharmaceutically acceptable acid addition salts thereof.

2. Spiroxyane.
3. 3-epispiroxyane.
4. 16α-methyl-17α-hydroxyspiroxyane.
5. 16α-methyl-17α-hydroxy-3-epispiroxyane.
6. 16α-carbomethoxy-17α-hydroxyspiroxyane.
7. 16α-carbomethoxy-17α-hydroxy-3-epispiroxyane.
8. 18-benzylidene-17-hydroxyspiroxyane.
9. 18-benzylidene-17-hydroxy-3-epispiroxyane.
10. 17-acetoxy-1-acetyl-16α-carbomethoxy spiroxyane.
11. 17 - acetoxy - 1-acetyl-16α-carbomethoxy-3-epispiroxyane.
12. 17-ketospiroxyane.
13. 17-keto-3-epispiroxyane.
14. 16α-methyl-17α-hydroxy-2-desoxyspiroxyane.
15. 16α-methyl-17-hydroxy-2-desoxy-3-epispiroxyane.
16. 16α - hydroxymethyl - 17α - hydroxy - 2-desoxyspiroxyane.
17. 16α - hydroxymethyl - 17α-hydroxy-2-desoxy-3-epispiroxyane.
18. 17α-acetoxy-16α-carbomethoxy spiroxyane.
19. 17α-acetoxy-16α-carbomethoxy-3-epispiroxyane.
20. A process for the production of a compound of the formula:

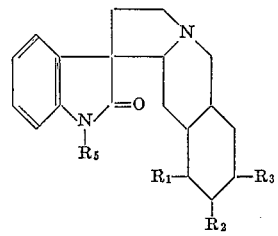

which comprises hydrolyzing at an acidic pH a compound of the formula:

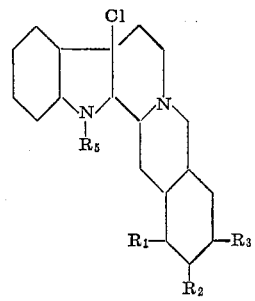

wherein R$_1$ is a member of the group consisting of hydrogen

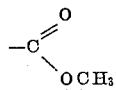

and methyl, R$_2$ is a member of the group consisting of hydrogen, oxygen, hydroxy, lower alkoxy and acyloxy, R$_3$ is a member of the group consisting of hydrogen and =CHC$_6$H$_4$R$_4$ in which R$_4$ is a member of the group consisting of hydrogen, halogen, hydroxy, and —OCH$_3$, and R$_5$ is a member of the group consisting of hydrogen and

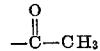

21. A process for the production of a compound of the formula:

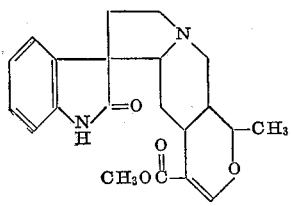

which comprises hydrolyzing at an acidic pH a compound of the formula:

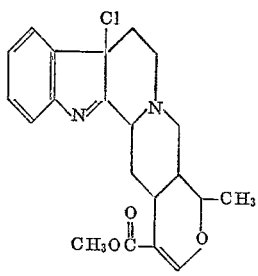

22. A process for the production of a compound of the formula:

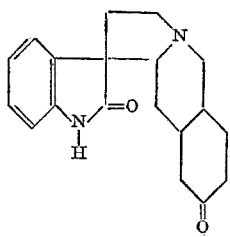

which comprises heating a compound of the formula:

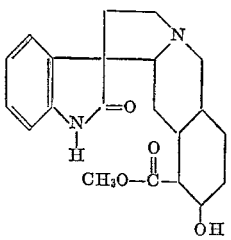

with cyclohexanone and aluminum phenoxide in an inert organic solvent.

23. A process in accordance with claim 22 wherein said inert organic solvent is xylene.

References Cited by the Examiner
UNITED STATES PATENTS 2,715,626   8/1955   Pfister et al. _____ 260—285
3,139,428   6/1964   Shavel et al. _____ 260—240

OTHER REFERENCES

Ban et al.: Chemistry and Industry, 1960, page 349 (Mar. 26, 1960).

Gaylord: "Reduction with Complex Metal Hydrides," pages 100 to 102, Interscience Publishers, Inc. (N.Y.) (1956).

Godtfredsen et al.: Acta Chem. Scan., vol. 10, pages 1414–1421 (1956).

Hendrickson: J. Am. Chem. Soc., vol. 84, pages 643–653 (Feb. 20, 1962).

Manske: "The Alkaloids," vol. 7, pages 19–20, 62, 85–86, 88 and 90–91, Academic Press (N.Y.) 1960.

Shavel et al.: II, J. Am. Chem. Soc., vol. 84, pages 1320–1321 (April 1962).

IRVING MARCUS, *Primary Examiner.*

JOHN D. RANDOLPH, WALTER A. MODANCE,
*Examiners.*